Patented Feb. 24, 1953

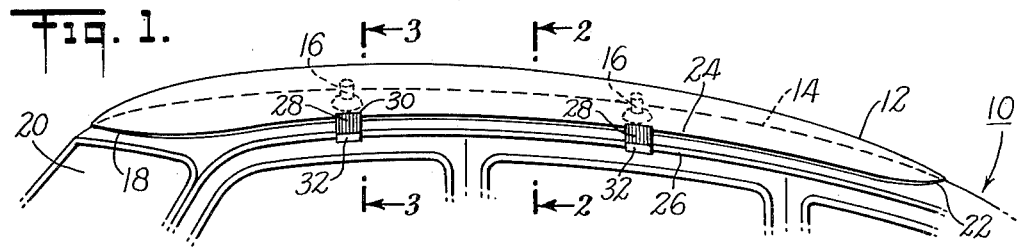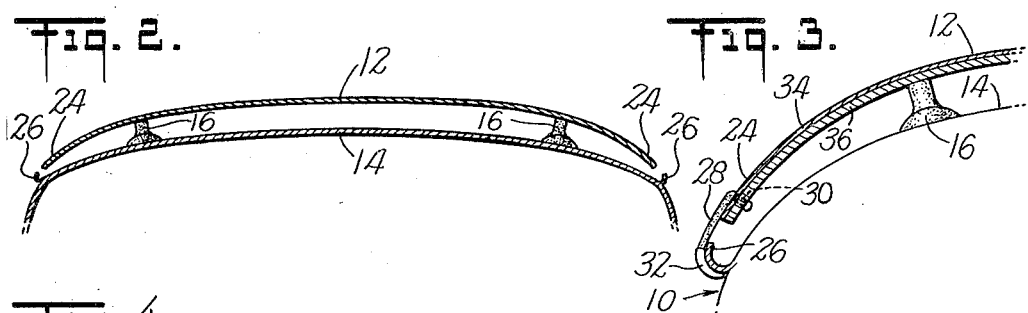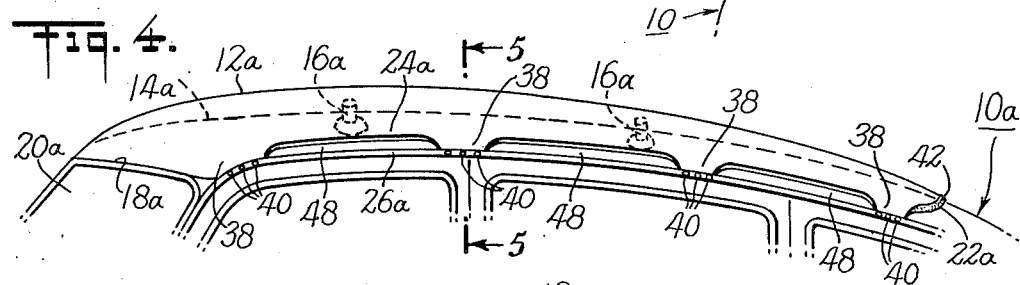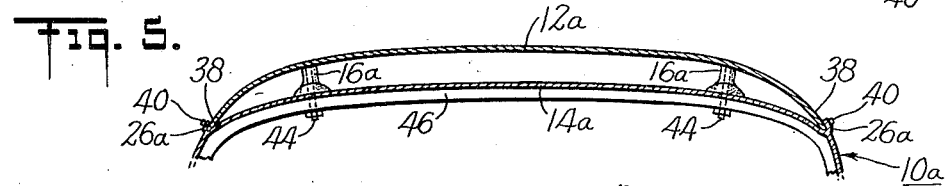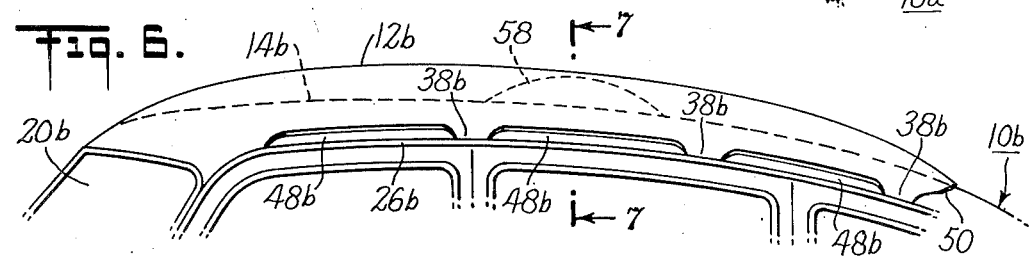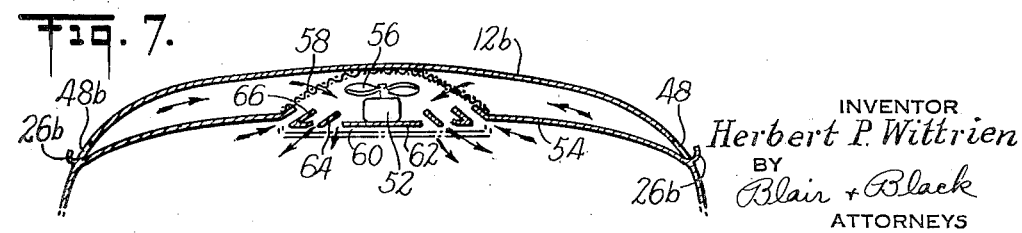

2,629,347

UNITED STATES PATENT OFFICE 2,629,347

HEAT PROTECTOR ROOF CONSTRUCTION FOR VEHICLES

Herbert P. Wittrien, Glendale, N. Y.

Application June 3, 1950, Serial No. 165,908

1 Claim. (Cl. 108—3)

1

My invention relates to a roof construction for an automobile, and more particularly to a vehicle overhead which is ventilated between roof and ceiling and preferably insulated for the purpose of keeping the interior cool.

It is most uncomfortable to enter a closed automobile which has been allowed to stand in the warm sunshine, and of equal inconvenience is the overheating which occurs in an automobile, truck, railway car, or a boat moving slowly during a hot, sunny day.

Accordingly, it is among the objects of my invention to provide a roof construction for vehicles which will prevent this inordinate heating. Another object is to provide a heat protector roof which is relatively inexpensive, sturdy, durable and attractively incorporated into the design of a modern vehicle. A further object is to provide an accessory to prevent overheating which conveniently may be attached to the roof of an automobile and the like when needed, and easily removed when its use is not required. A still further object is to provide such an accessory which is insulated against the passage of heat, and which permits ventilation of an air compartment above the roof. Another object is to provide a roof construction which employs the aforementioned cooling features, but which is built as an integral part of the vehicle during manufacture. It is an object in another embodiment of my invention to provide forced-draft ventilation in the air compartment between ceiling and roof of the abovementioned constructions. These and other objects will be in part apparent and in part pointed out in the disclosure which follows.

The invention accordingly consists in the features of construction, combinations of elements, arrangements of parts, and relation and order of each of the same to one or more of the others, all as will be illustratively described herein, and the scope of the application of which will be indicated in the following claim.

In the drawings wherein there is shown one embodiment of the invention:

Figure 1 is a perspective view of the top body portion of an automobile showing a heat protector roof attached thereto;

Figure 2 is a section taken along line 2—2 of Figure 1;

Figure 3 is an enlarged section taken along line 3—3 of Figure 1;

Figure 4 is a perspective view similar to Figure 1 showing an alternate construction;

Figure 5 is a section taken along line 5—5 of Figure 4;

2

Figure 6 is a perspective view of the top body portion of an automobile having a built-in heat protector roof equipped with a suction fan; and, Figure 7 is a view taken along line 7—7 of Figure 6.

Similar reference characters refer to similar parts throughout the several views of the drawing.

In accordance with one embodiment of my invention, a dome-like heat protector roof accessory is removably attached to the turret top of an automobile and has resilient mountings to maintain the desired spacing for an air compartment above the top, while a plurality of straps along the periphery clamp to the rain gutter of the car to hold the accessory firmly in place. The front edge of the accessory preferably fits against the top along a line above the windshield and may be provided with a rubber stripping for tight sealing and to prevent marring of the top, and at least a portion of the rear edge rests on the top in like manner, but both longitudinal edges lie above to leave openings along the sides for circulation of air through the air compartment between roof and top. The heat protector roof is preferably insulated against heat, as by a laminated metal and asbestos construction, to maintain a temperature gradient as high as possible.

This accessory is lightweight and conveniently attaches to a vehicle when needed, and it is highly effective in keeping the interior of the body cool when the hot sun is beating down, its insulation resists excessive heat and open sides permit convection of cooler currents of air. Thus, even while standing with windows closed, an automobile equipped with my heat protector roof remains relatively cool, as tests indicate that a difference up to 35° F. results in the inside temperature with my heat protector roof, as compared with identical conditions without the roof. With windows open the automobile naturally remains considerably cooler inside, but even then a temperature advantage in the order of 15° F. is gained by attaching an insulated heat protector roof. When the automobile is in motion there is, of course, a heavy passage of air between the roof accessory and top, but by employing my design for attachment and strapping and by sealing the front edge, no vibration or disturbance takes place even at high speeds. There is thus provided a convenient, inexpensive and effective attachment to prevent overheating of the interior of an automobile by intense sunshine.

In another embodiment of my invention a heat protector roof functioning the same as the one just described is designed for permanent attachment to an automobile. Resilient spacers are used as before with bolts extending through the core and fastening to the top rib of the automobile frame. The front and rear edges preferably rest against the top as before, but the longitudinal sides instead of extending straight back have saddle portions which project into the rain gutter where they are secured to the top as by screws. Such construction provides a low, dome roof of the same general contour as the automobile top so that the over-all design is not materially altered, and slit-like openings remain along each side for circulation of air. The invention may therefore serve as an automobile accessory to be attached when needed, or become a permanent addition thereto.

A third embodiment is a structure which has the cooling features above set forth, but which is an integral part of the body by manufacturing the automobile frame with an insulated metal dome roof and an interior ceiling spaced therebelow. Openings for ventilation are disposed along each side and at the rear of the roof, and an electric suction fan is mounted in the air compartment between roof and ceiling to provide effective forced-draft and resulting inhibition of overheating inside of the car. The fan is mounted in the center with the blade revolving in a horizontal plane above its motor and curved to direct air downwardly. A louvre system across the ceiling opening for the fan lends direction to channel air currents in predetermined paths in and out of the automobile, such that warm air is directed from the underside of the ceiling surface and out of the space between ceiling and roof. The use of this fan causes the automobile to remain far cooler while standing, but a slidable partition may be provided to cover the ceiling opening when the fan is not in use, as when the car is in motion or the ambient temperature is low. My invention therefore can be embodied in an accessory, or it can compose a fixed part of either an old or a new automobile and have provision for forced air circulation.

Referring now to the drawings, in Figure 1 the top body portion 10 of a conventional automobile is shown with a heat protector roof 12 mounted and resting on metal top 14. Roof 12 follows the general contour of top 14 and is spaced therefrom by a plurality of resilient mountings, such as rubber spacers 16, that are conveniently located away from the edges as shown by Figure 3, but for added tenacity and to prevent warping of roof 12, spacers 16 may be in the form of suction cups. Front edge 18 of roof 12 preferably rests firmly against roof 14 near the upper part of windshield 20 and may be provided with a soft rubber edge (not shown) to perfect an air seal and to prevent marring. Rear edge 22 may have a similar close fit, though openings may be provided along this line for more circulation if desired. Each side 24 of roof 12 leaves an opening above top 14, however, so that proper circulation of air can take place (Figure 2). This design and construction causes roof 12 to blend with the streamlining of the vehicle, and by having edges 24 extend over the side into rain gutters 26, proper drainage of rain water is provided, while the infiltration of foreign matter between roof 12 and top 14 is inhibited almost entirely by front edge 18 being closed.

Roof 12 is securely attached to top 14 by a plurality of straps 28, the detailed construction of which is shown in Figure 3 where, illustratively, a rubber strap 28 extends through and is fastened to an opening 30 in roof 12, and is provided with a hook 32 which attaches under rain gutter 26 when strap 28 is stretched, as by a suitable hand tool (not shown). In this way, edge 24 of roof 12 is held in place along a line parallel to and slightly above rain gutter 26, and roof 12 is forced downwardly to place spacers 16 under slight compression and accordingly cause firm attachment.

Also illustrated in Figure 3 is the laminated construction of roof 12 with metal sheeting 34 forming the exposed side and an insulated lining 36, e. g. asbestos, lying underneath to inhibit conduction of heat through the roof. Cooling results both from ventilating the space above top 14 and in avoiding overheating by using an insulated heat protector roof.

A second embodiment of my invention, shown in Figure 4, is designed for permanent installation on an automobile. A heat protector roof 12a, substantially identical to the one above described, fits over top 14a in spaced relationship with spacers 16a therebetween, and front edge 18a fitting tightly above windshield 20a of automobile 10a; but sides 24a, instead of running parallel to rain gutter 26a throughout their length, are provided with a plurality of saddles 38 extending downwardly into rain gutter 26a where they are secured to top 14a as by screws 40. Rear edge 22a may be open for a portion, but is provided with a soft rubber strip 42 where it rests against the automobile body. Instead of being ordinary suction cups, spacers 16a have bolts 44 passing through their centers and attaching to ribs 46 in the frame of automobile 10a (Figure 5) such that when installed, heat protector roof 12a is a permanent part of the vehicle. Ventilating air is free to pass through openings 48 along the sides between saddles 38 and through the opening left below rear edge 22a, and preferably roof 12a is insulated in the fashion shown in Figure 3.

In still another embodiment of my invention, a heat protector roof 12b is built in at the factory as an integral part of automobile 10b (Figure 6). Here the heat protector roof serves not only the cooling purposes above described for roofs 12 and 12a, but it is also the strong metal top of the automobile. A ceiling 54 (Figure 7) is spaced below roof 12b and defines an air compartment as before. Openings 48b are disposed on each side above rain gutter 26b, and saddle portions 38b project into the automobile frame for support. No opening is provided along the front so that dust and foreign matter will be kept free from the compartment between roof 12b and ceiling 54, but a passageway 50 is provided at the rear for air. For additional ventilation, a circulating fan 52 is mounted above ceiling 54 (Figure 7), with blade 56 positioned above the motor and curved to direct air downwardly. Fan 52 is protected by a dome-shaped screen 58, and a louvre system extends over opening 60 in ceiling 54 to control the flow of air through both the space above the ceiling and throughout the inside of the automobile. The louvre system comprises a substantially flat central plate 62, a circular downwardly diverging portion 64, and a peripheral ring 66 which is V-shaped in cross section, as shown in Figure 7. This louvre system controls the air currents set up by fan 52 so that flow is inwardly toward the fan, both from along the underside of ceiling 54 and in the void space between ceiling 54 and roof 12b, as illustrated by the arrows. Downward flow of air is restricted to the openings between louvre sections 62 and 64, and 64 and 66, and the respective sections are shaped so that interference is avoided between the intake side and the exhaust side of the fan, as the arrows indicate.

Though a ventilating fan, as above described, is not essential to effective prevention of overheating inside the vehicle, it has been found very convenient and comforting to use a fan, particularly when the vehicle is not moving. A rapid exchange of warm air for cool can thus be effected in the space above the ceiling so that if the car windows are kept open slightly, the inside of the automobile will at all times remain remarkably cool, to the pleasure of the passengers. A cover 68, shown in broken lines in Figure 7, may be used to close opening 60 when fan 52 is not in use.

Thus by simple and economical structure according to my invention, the interior of a vehicle may be protected from the heat of the sun. The invention is suitably incorporated either into a removable accessory, or as a device for permanent installation, or alternately, the body of the vehicle may be manufactured to include these same features.

Since many possible embodiments may be made of mechanical features of the above invention, and since the art herein described may be varied in various parts, all without departing from the scope of the invention, it is to be understood that all matter hereinbefore set forth, or shown in the accompanying drawings, is to be interpreted as illustrative and not in a limiting sense.

I claim:

An accessory for a vehicle roof, which roof has sloping sides with rain gutters extending longitudinally along opposite edges, said accessory comprising a rigid metallic body portion having a contour generally similar to that of said roof so as to fit thereover between said rain gutters, said body portion having its leading edge formed to fit flush against said roof and portions of its sides formed to extend into said gutters and also having portions along its sides cut away to form air vents along its sides above said gutters and between said portions that extend into said gutters, insulating material fastened to the undersurface of said body portion, and means for releasably attaching said body portion to said roof, there being a space between said roof and said insulating material when said body portion is attached to said roof.

HERBERT P. WITTRIEN.

REFERENCES CITED

The following references are of record in the file of this patent:

UNITED STATES PATENTS

| Number | Name | Date |
|---|---|---|
| 778,620 | Wylie | Dec. 27, 1904 |
| 1,530,540 | Bouffier | Mar. 24, 1925 |
| 2,087,651 | Mygland | July 20, 1937 |
| 2,202,703 | Lintern | May 28, 1940 |
| 2,479,825 | Fleischhauer | Aug. 23, 1949 |
| 2,496,085 | Engelhart | Jan. 31, 1950 |
| 2,508,757 | Gray | May 23, 1950 |
| 2,602,406 | Orter | July 8, 1952 |